US012544922B2

(12) United States Patent
Kishimoto et al.

(10) Patent No.: US 12,544,922 B2
(45) Date of Patent: Feb. 10, 2026

(54) CONTROL DEVICE AND CONTROL SYSTEM

(71) Applicant: DAIKIN INDUSTRIES, LTD., Osaka (JP)

(72) Inventors: Hidetaka Kishimoto, Osaka (JP); Takuya Hanada, Osaka (JP); Masakazu Okamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 68 days.

(21) Appl. No.: 18/540,494

(22) Filed: Dec. 14, 2023

(65) Prior Publication Data

US 2024/0109194 A1   Apr. 4, 2024

Related U.S. Application Data

(63) Continuation of application No. PCT/JP2022/023934, filed on Jun. 15, 2022.

(30) Foreign Application Priority Data

Jun. 16, 2021   (JP) .................. 2021-100386

(51) Int. Cl.
*B25J 9/16*   (2006.01)
*B25J 9/00*   (2006.01)
(Continued)

(52) U.S. Cl.
CPC ........... *B25J 9/1656* (2013.01); *B25J 9/0084* (2013.01); *G05B 23/0283* (2013.01);
(Continued)

(58) Field of Classification Search
CPC ... B25J 9/1656; B25J 9/0084; G05B 23/0283; G05B 2219/2614; G05B 15/02;
(Continued)

(56) References Cited

U.S. PATENT DOCUMENTS 10,282,788 B1 *   5/2019   Jordan, II ............... G06Q 30/01
12,000,608 B2 *   6/2024   Willmott .................. F24F 11/65
(Continued)

FOREIGN PATENT DOCUMENTS

JP   2003-91313 A   3/2003
JP   2019-175279 A   10/2019
JP   2021-105895 A   7/2021

OTHER PUBLICATIONS

International Search Report of corresponding PCT Application No. PCT/JP2022/023934 dated Sep. 6, 2022.
(Continued)

*Primary Examiner* — Sohana Tanju Khayer
(74) *Attorney, Agent, or Firm* — Spencer Fane LLP

(57) ABSTRACT

A control device includes an acquisition unit and a control unit. The acquisition unit acquires first information indicating information on an operating time of a first device and an environmental condition that influences a life of a first instrument provided for the first device, and information on an operating time of a second device and an environmental condition that influences a life of a second instrument provided for the second device. The control unit operates the first device and the second device in conjunction with each other based on the first information acquired by the acquisition unit.

13 Claims, 6 Drawing Sheets

(51) Int. Cl.
  *F24F 11/62* (2018.01)
  *G05B 23/02* (2006.01)
(52) U.S. Cl.
  CPC ....... *F24F 11/62* (2018.01); *G05B 2219/2614* (2013.01); *Y02B 30/70* (2013.01)
(58) Field of Classification Search
  CPC .... F24F 11/62; F24F 2110/30; F24F 2110/64; Y02B 30/70
  See application file for complete search history.

(56) References Cited

U.S. PATENT DOCUMENTS

| | | |
|---|---|---|
| 2003/0055534 A1 | 3/2003 | Saito et al. |
| 2006/0100891 A1* | 5/2006 | Koyanagi ............... G06Q 10/06 705/35 |
| 2007/0005191 A1* | 1/2007 | Sloup ..................... G05B 17/02 700/276 |
| 2009/0025565 A1* | 1/2009 | Cho ................... B01D 46/4272 96/393 |
| 2011/0093121 A1* | 4/2011 | Wakuta ................... F24F 11/30 700/291 |
| 2011/0217917 A1 | 9/2011 | Sulva |
| 2014/0099872 A1* | 4/2014 | Matsumoto .............. F24F 11/76 454/229 |
| 2014/0184315 A1* | 7/2014 | Wallace ................ H02J 3/1821 327/532 |
| 2015/0045975 A1* | 2/2015 | Holub .................... G05B 15/02 700/295 |
| 2015/0051739 A1* | 2/2015 | Song ..................... G05B 15/02 700/276 |
| 2015/0159553 A1* | 6/2015 | Kippel .................... F02C 7/055 374/5 |
| 2015/0185111 A1 | 7/2015 | Armstrong et al. |
| 2015/0292763 A1* | 10/2015 | Jung ........................ F24F 11/58 700/276 |
| 2015/0295803 A1* | 10/2015 | Jung ...................... G05B 15/02 709/224 |
| 2015/0308704 A1* | 10/2015 | Jung ........................ F24F 11/58 700/276 |
| 2016/0004566 A1* | 1/2016 | Kuchiwaki ........... G06F 9/4881 718/100 |
| 2017/0307245 A1* | 10/2017 | Itaya ....................... F24F 11/30 |
| 2018/0073386 A1* | 3/2018 | Zhang .................. F01D 25/002 |
| 2018/0152425 A1* | 5/2018 | Ram ....................... H04L 63/10 |
| 2018/0164785 A1* | 6/2018 | Frederick ............... G05B 15/02 |
| 2018/0347843 A1 | 12/2018 | Friedenberger et al. |
| 2019/0032945 A1 | 1/2019 | Willmott et al. |
| 2020/0086871 A1 | 3/2020 | Gotoda et al. |
| 2021/0131686 A1* | 5/2021 | Dyess ..................... F24F 11/56 |
| 2021/0172633 A1* | 6/2021 | Hoglund .............. G05B 13/048 |
| 2021/0302049 A1* | 9/2021 | Aharonyan ........... G05B 15/02 |
| 2022/0399182 A1* | 12/2022 | Umeda ................ H01J 37/3288 |
| 2023/0080073 A1* | 3/2023 | Kyoya ................... G06N 20/00 706/12 |
| 2023/0118509 A1* | 4/2023 | Lee .......................... F24F 7/08 700/276 |

OTHER PUBLICATIONS

International Preliminary Report of corresponding PCT Application No. PCT/JP2022/023934 dated Dec. 28, 2023.
European Search Report of corresponding EP Application No. 22 82 5025.4 dated Feb. 10, 2025.

* cited by examiner

CONTROL DEVICE AND CONTROL SYSTEM

CROSS-REFERENCE TO RELATED APPLICATIONS

This is a continuation of International Application No. PCT/JP2022/023934 filed on Jun. 15, 2022, which claims priority to Japanese Patent Application No. 2021-100386, filed on Jun. 16, 2021. The entire disclosures of these applications are incorporated by reference herein.

BACKGROUND

Technical Field

The present disclosure relates to a control device and a control system.

Background Art

Japanese Unexamined Patent Publication No. 2020-190919 discloses a control device that determines whether a failure is predicted for each component of a plurality of robots and estimates the failure timing of the component for which a failure is predicted. The control device adjusts maintenance timing based on the estimated failure timing and adjusts a workload for each robot so that the robot will operate until the maintenance timing.

SUMMARY

A first aspect of the present disclosure is directed to a control device including an acquisition unit and a control unit. The acquisition unit is configured to acquire first information indicating information on an operating time of a first device and an environmental condition that influences a life of a first instrument provided for the first device, and information on an operating time of a second device and an environmental condition that influences a life of a second instrument provided for the second device. The control unit is configured to operate the first device and the second device in conjunction with each other based on the first information acquired by the acquisition unit.

DETAILED DESCRIPTION OF EMBODIMENT(S)

Embodiments of the present invention will be described in detail below with reference to the drawings. The following embodiments are merely exemplary ones in nature, and are not intended to limit the scope, application, or use of the present invention. Features of the embodiments, variations, and other examples described below can be combined or partially substituted within the range where the present invention can be embodied.

First Embodiment

Ventilation Control System

A ventilation control system (10) according to a first embodiment is a control system (10) of the present disclosure. The ventilation control system (10) includes a plurality of ventilation devices (U) and control devices (C).

Figure 1:
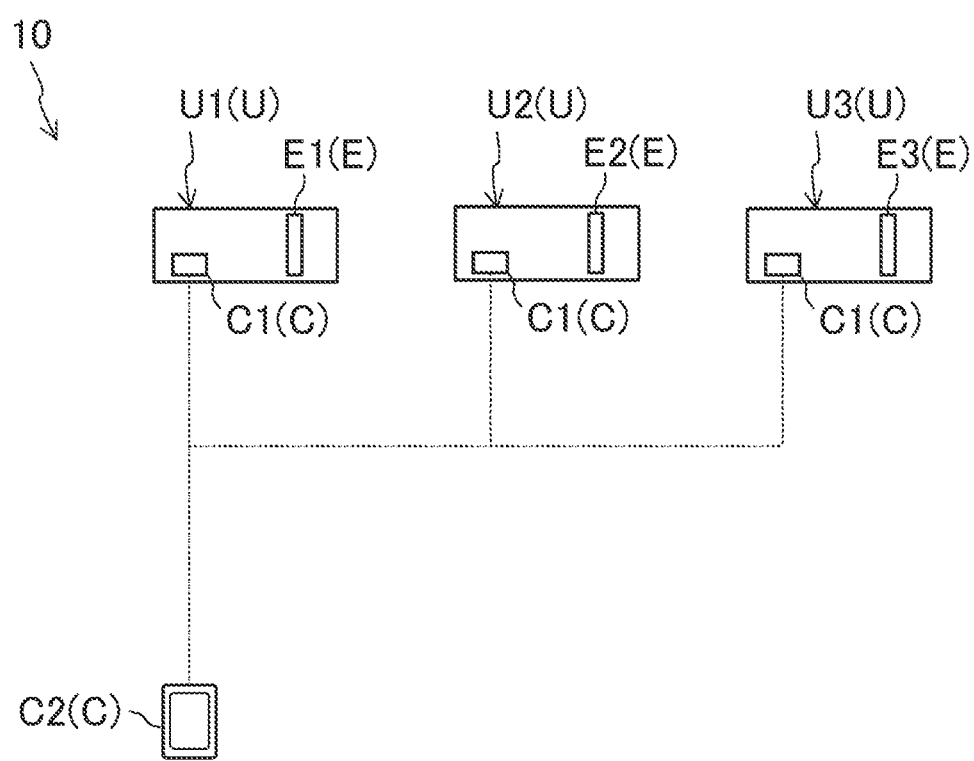
FIG. 1 is a general configuration diagram schematically illustrating a control system according to a first embodiment.

The plurality of ventilation devices (U) ventilates the same indoor space. The ventilation devices (U) are arranged, for example, above a ceiling. As schematically illustrated in FIG. 1, the ventilation control system (10) of this example has three ventilation devices (U1 to U3).

The three ventilation devices (U1 to U3) are a first ventilation device (U1), a second ventilation device (U2), and a third ventilation device (U3). The first ventilation device (U1) is a first device (U1) of the present disclosure. The second ventilation device (U2) is a second device (U2) of the present disclosure. The number of ventilation devices (U) is not limited to the above number and may be any number as long as there are two or more ventilation devices (U). The control device (C) controls the three ventilation devices (U). The three ventilation devices (U1 to U3) are comprised of identical instruments and components. Thus, in the following description, the three ventilation devices (U1 to U3) may be simply referred to as a ventilation device (U) without being distinguished from each other. Further, in the following description, the ventilation devices (U) indicate the first ventilation device (U1), the second ventilation device (U2), and the third ventilation device (U3).

(1) Ventilation Device

Figure 2:
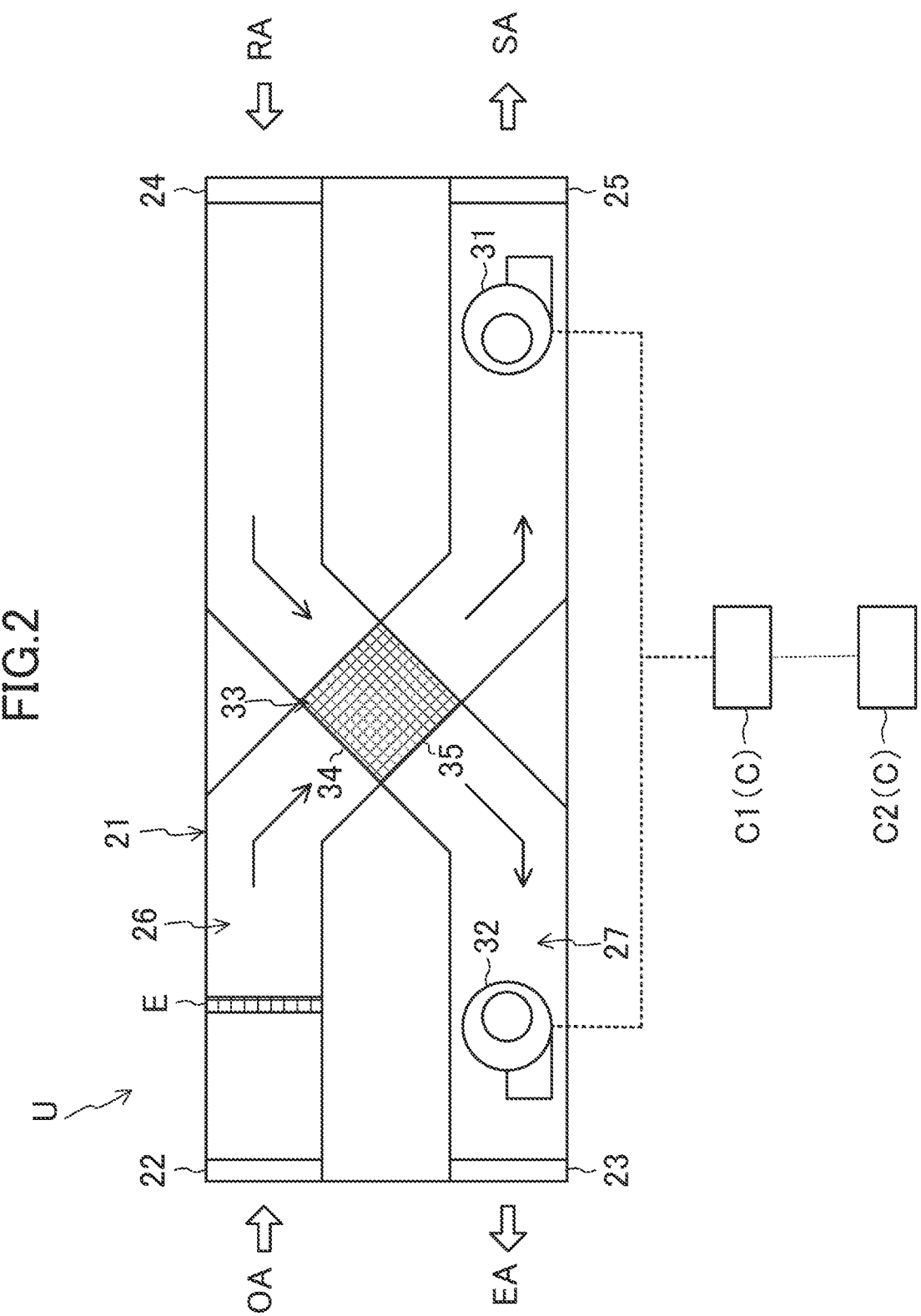
FIG. 2 is a configuration diagram schematically illustrating a ventilation device.

A schematic configuration of the ventilation device (U) will be described with reference to FIG. 2. The ventilation device (U) includes a casing (21), an air supply fan (31), an exhaust fan (32), a total heat exchanger (33), and a filter (E).

(1-1) Casing

The casing (21) is formed in a hollow box-like shape. The casing (21) includes an outdoor air port (22), an exhaust port (23), an indoor air port (24), and an air supply port (25). Each of the outdoor air port (22) and the exhaust port (23) communicates with an outdoor space via a duct. The outdoor air port (22) is a suction port (22) of the present disclosure. The outdoor air port (22) sucks air from the outdoor space. Air is a fluid of the present disclosure. Each of the indoor air port (24) and the air supply port (25) communicates with the indoor space via a duct. The air supply port (25) is a discharge port (25) of the present disclosure. The air supply port (25) discharges air to the duct communicating with the indoor space.

Inside the casing (21), an air supply passage (26) and an exhaust passage (27) are formed. The air supply passage (26) is formed so as to connect the outdoor air port (22) and the air supply port (25). The air supply passage (26) is a fluid passage (26) of the present disclosure. The exhaust passage (27) extends from the indoor air port (24) to the exhaust port (23). An air supply fan (31) is arranged in the air supply passage (26), and an exhaust fan (32) is arranged in the exhaust passage (27).

(1-2) Air Supply Fan and Exhaust Fan

The air supply fan (31) and the exhaust fan (32) are comprised of sirocco fans, for example. Each of the air supply fan (31) and the exhaust fan (32) is configured such that its air volume is variable. Specifically, the volume of air of each fan (31, 32) is switchable in multiple stages by controlling the number of rotations of a motor provided in each of the air supply fan (31) and the exhaust fan (32). The air supply fan (31) is a conveyor (31) of the present disclosure. The air supply fan (31) is driven by the motor to convey air in the air supply passage (26).

(1-3) Total Heat Exchanger

The total heat exchanger (33) is arranged astride the air supply passage (26) and the exhaust passage (27). The total heat exchanger (33) has a first passage (34) connected to the air supply passage (26), and a second passage (35) connected to the exhaust passage (27). The total heat exchanger (33) exchanges sensible heat and latent heat between first air flowing in the first passage (34) and second air flowing in the second passage (35).

(1-4) Filter

The filter (E) is arranged in the air supply passage (26). Specifically, the filter (E) is arranged upstream of the total heat exchanger (33) in the air supply passage (26). The filter (E) removes fine particles, such as those of dust, mites, and pollen, contained in air that has flowed into the air supply passage (26) through the outdoor air port (22). The filter (E) is provided for each ventilation device (U). Specifically, the first ventilation device (U1) includes a first filter (E1). The second ventilation device (U2) includes a second filter (E2). The third ventilation device (U3) includes a third filter (E3). The first filter (E1) is a first instrument (E1) of the present disclosure. The second filter (E2) is a second instrument (E2) of the present disclosure. In the following description, the three filters (E1 to E3) may be simply referred to as a filter (E) without being distinguished from each other. Further, in the following description, the filters (E) indicate the first filter (E1), the second filter (E2), and the third filter (E3).

(2) Control Device

Figure 3:
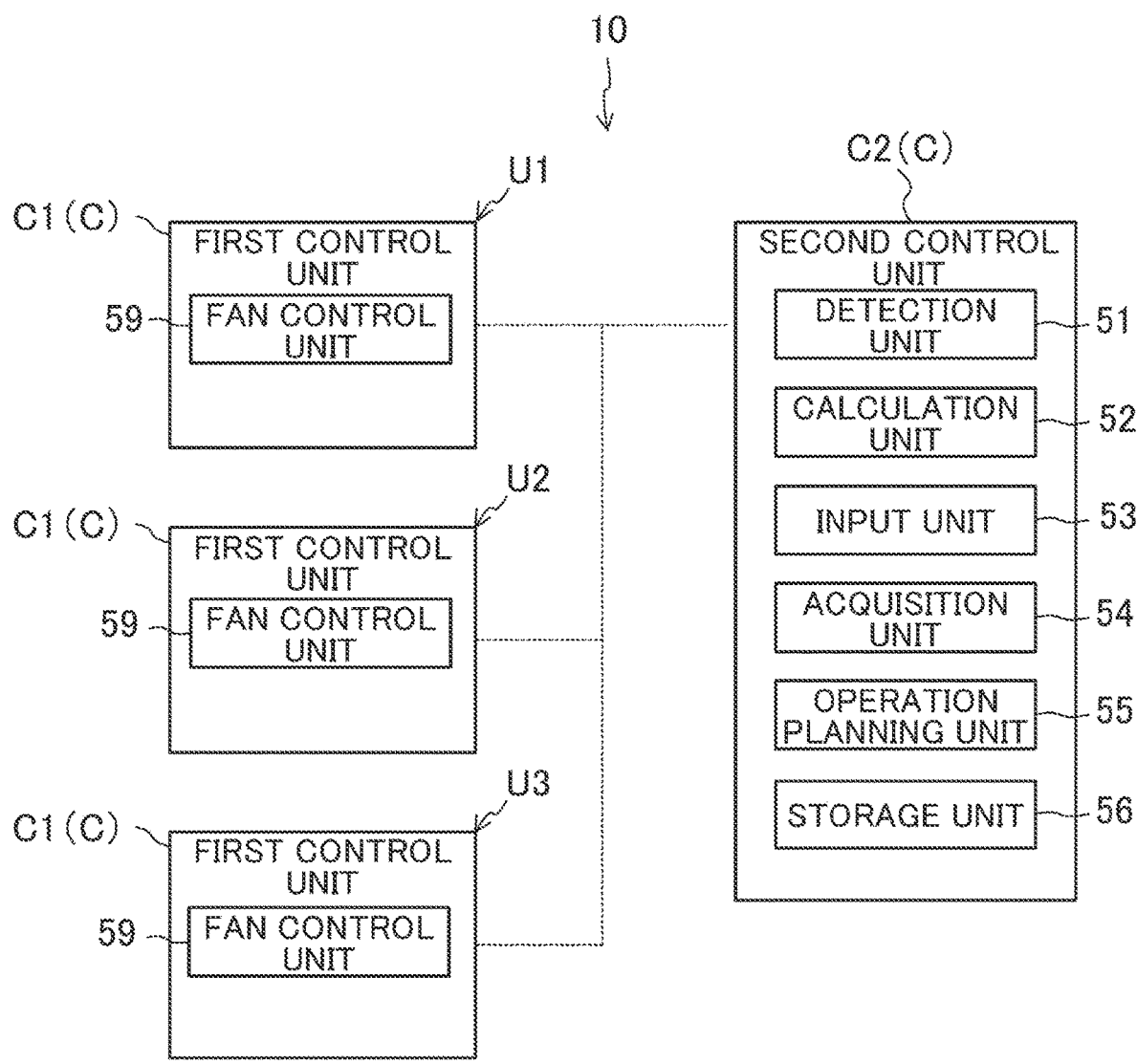
FIG. 3 is a block diagram of a control device of the control system.

As illustrated in FIG. 3, the control device (C) has, for example, a control board, a processor (e.g., microcomputer) mounted on the control board, and a memory device (e.g., semiconductor memory) storing software for operating the processor. The control device (C) has a first control unit (C1) and a second control unit (C2). The first control unit (C1) and the second control unit (C2) are connected to each other via a wired or wireless communication line.

(2-1) First Control Unit

The first control unit (C1) is provided for each ventilation device (U). The first control unit (C1) has a fan control unit (59). The fan control unit (59) controls operation of the air supply fan (31) and the exhaust fan (32) based on a control signal output from the second control unit (C2).

(2-2) Second Control Unit

The second control unit (C2) is, for example, a remote controller arranged in the indoor space. The second control unit (C2) is a control unit (C2) of the present disclosure. The second control unit (C2) is shared by all the ventilation devices (U1 to U3). The second control unit (C2) transmits an operation command to each ventilation device (U). Specifically, for example, the second control unit (C2) sets the operating state of each ventilation device (U) during operation, based on information on the lives of the first filter (E1) and the second filter (E2). Although details will be described later, for example, the second control unit (C2) switches ON and OFF of each of the air supply fans (31) and each of the exhaust fans (32) and/or allocates the volume of air for each ventilation device (U) such that predetermined required volume of air is satisfied. Specifically, in a case where the required volume of air is 600 m³/h and the first ventilation device (U1) and the second ventilation device (U2) of the three ventilation devices (U1 to U3) are operated, the volume of air of the first ventilation device (U1) is set to 300 m³/h and the volume of air of the second ventilation device (U2) is set to 300 m³/h, or the volume of air of the first ventilation device (U1) is set to 500 m³/h and the volume of air of the second ventilation device (U2) is set to 100 m³/h.

In this manner, the second control unit (C2) sets the operating state of each ventilation device (U) so as to balance the volume of air. The second control unit (C2) operates the ventilation devices (U) in conjunction with each other, based on the set operating state. The information on the life of each filter (E) is acquired by an acquisition unit (54) described later.

The second control unit (C2) includes a detection unit (51), a calculation unit (52), an input unit (53), the acquisition unit (54), an operation planning unit (55), and a storage unit (56).

(2-2-1) Detection Unit

The detection unit (51) detects the operating state of each ventilation device (U). Specifically, the detection unit (51) detects the power consumption of the air supply fan (31) and the exhaust fan (32) of each ventilation device (U) and the number of rotations of the motor.

(2-2-2) Calculation Unit

The calculation unit (52) calculates an external static pressure based on the power consumption of the air supply fan (31) and the number of rotations of the motor. The external static pressure is the static pressure of air conveyed by the air supply fan (31) of the present disclosure. The calculation unit (52) calculates a power consumption cost corresponding to the volume of air of each of the air supply fan (31) and the exhaust fan (32).

(2-2-3) Input Unit

Information on predetermined operation of the ventilation device (U) is input to the input unit (53). The information on the predetermined operation includes, for example, a maintenance schedule for the ventilation device (U), a cost related to the ventilation device (U), and the power consumption of the ventilation devices (U1 to U3). In the following description, the "filter (E) of each ventilation device (U)" includes the first filter (E1) and the second filter (E2). The predetermined operation information is input through user's operation.

The maintenance schedule is a schedule for performing maintenance of the filter (E) of each ventilation device (U). The maintenance of this example is replacement of the filter (E). The maintenance schedule is the timing of replacement of the filter (E) of each ventilation device (U). The timing of replacement of the filter (E) may be set based on the predetermined durable period of the filter (E) or may be set arbitrarily.

The cost related to the ventilation device (U) is a first cost related to the filter (E) of each ventilation device (U). Specifically, the first cost is a cost required for replacement of the filter (E) of each ventilation device (U). The cost required for replacement of the filter (E) includes, for example, the cost of the filter (E), the cost of a component attached to the filter (E), and a labor cost required for replacement.

The power consumption of the ventilation devices (U1 to U3) is the power consumption of the first device (U1) and the second device (U2) of the present disclosure. The power consumption of the ventilation devices (U1 to U3) of this example is the power consumption of the air supply fan (31) and the exhaust fan (32). Specifically, the power consumption of the ventilation devices (U1 to U3) of this example is the power consumption corresponding to the number of rotations of the motor of each of the air supply fan (31) and the exhaust fan (32). In other words, the power consumption of the ventilation devices (U1 to U3) is the power consumption corresponding to the volume of air of each of the air supply fan (31) and the exhaust fan (32).

(2-2-4) Acquisition Unit

The acquisition unit (54) acquires first information on the life of each filter (E). Here, the life refers to a period until the time when the filter (E) is estimated to be unusable. The state of being unusable refers to a state in which the function of the filter (E) cannot be fulfilled. The time when the filter (E) is estimated to be unusable refers to the end of the life of the filter (E). The end of the life may be a specific date (for example, xth day of xth month) or may be a certain period (for example, a period from one month to two months later).

The first information of this embodiment is the level of the external static pressure. For example, in a case where the filter (E) is clogged with, e.g., dust contained in the air flowing in the air supply passage (26), the external static pressure increases and the volume of air decreases. Accordingly, the life of the filter (E) can be estimated using the level of the external static pressure as the first information. The external static pressure is influenced by, e.g., the length or shape of the duct connected to the air supply port (25). For this reason, in a case where the ducts connected to the air supply ports (25) of the first to third ventilation devices (U1 to U3) have, for example, different lengths or shapes, a predetermined reference value may be set for each ventilation device (U), and a value of the change in the difference between an actual measurement value of the external static pressure and the reference value may be used as the first information on the life of the filter (E). In this case, the predetermined reference value may be the value of the external static pressure immediately after replacement of the filter (E).

(2-2-5) Storage Unit

The storage unit (56) saves four types of operating modes (first operating mode, second operating mode, third operating mode, and fourth operating mode). Each operating mode will be described later.

(2-2-6) Operation Planning Unit

The operation planning unit (55) creates a control pattern for the first to third ventilation devices (U1 to U3) based on one operating mode selected from the four types of operating modes. One operating mode is selected by user's operation. Hereinafter, each operating mode will be described.

The first operating mode is a mode in which the first to third ventilation devices (U1 to U3) are operated in conjunction with each other based on the first information on each filter (E) such that the end of the lives of the three filters (E) comes at the same timing. For example, in the first operating mode, each ventilation device (U) is controlled such that the level of the external static pressure (first information) is the same among the first to third ventilation devices (U1 to U3). Specifically, the three ventilation devices (U) are controlled so as to satisfy an amount of supply air required for the indoor space (required volume of air) by allocation of the volume of air to the ventilation devices (U) in a sequential manner from the ventilation device (U) with lower external static pressure. In this case, the ventilation device (U) including the filter (E) having a relatively long life (i.e., a filter with relatively less performance degradation) is preferentially operated, by which the performance degradation of this filter (E) proceeds, resulting in the same life among the first to third filters (E1 to E3) of the first to third ventilation devices (U1 to U3) in the end.

The second operating mode is a mode in which the first to third ventilation devices (U1 to U3) are operated in conjunction with each other based on the first information on each filter (E) such that the lives of the first to third filters (E1 to E3) sequentially end. For example, in the second operating mode, the first to third ventilation devices (U1 to U3) are controlled so as to satisfy the required volume of air by allocation of the volume of air to the ventilation devices (U1 to U3) in a sequential manner from the ventilation device (U) with the highest external static pressure (first information) among the three ventilation devices (U1 to U3). In this case, the ventilation device (U) including the filter (E) having the shortest life (with the greatest performance degradation) is preferentially operated, so that this ventilation device (U) ends its life earlier than the other ventilation devices (U). Next, one of the remaining two ventilation devices (U) having a higher external static pressure is preferentially operated, so that this ventilation device (U) ends its life earlier than the other ventilation device (U).

The third operating mode is a mode in which the first to third ventilation devices (U1 to U3) are operated in conjunction with each other based on the first information on each filter (E) and the maintenance schedule for each filter (E). For example, in the third operating mode, the air supply fans (31) and the exhaust fans (32) of the first to third ventilation devices (U1 to U3) are operated in conjunction with each other such that the life of the first filter (E1) ends at the time of replacement of the first filter (E1).

Specifically, in the third operating mode, if there is a filter (E) whose life is longer than the period until the maintenance timing (i.e., a filter with relatively less performance degradation), the capacity (the number of rotations of the air supply fan (31)) of the ventilation device (U) having this filter (E) is increased to allocate the required volume of air preferentially. On the other hand, if there is a filter (E) whose life is shorter than the period until the maintenance timing (i.e., a filter with relatively greater performance degradation), the capacity (the number of rotations of the air supply fan (31)) of the ventilation device (U) having this filter (E) is decreased to reduce the volume of air to be allocated.

In this manner, the ventilation device (U) is operated such that the maintenance timing for the filter (E) coincides with the end of the life of the filter (E). The end of the life of the filter (E) may be later than the maintenance timing for the filter (E) as long as the first to third ventilation devices (U1 to U3) are controlled so as to satisfy the required volume of air. The third operating mode may be executed in accordance with the maintenance schedule for all the first to third filters (E1 to E3), or may be executed in accordance with the maintenance schedule for some of the first to third filters (E1 to E3).

The fourth operating mode is a mode in which the first to third ventilation devices (U1 to U3) are operated in conjunction with each other based on the first information on the first to third filters (E1 to E3), the power consumption of the first to third ventilation devices (U1 to U3), and the first cost for the first to third filters (E1 to E3). Here, the power consumption of the first to third ventilation devices (U1 to U3) is the power consumption of the air supply fan (31) and the exhaust fan (32) at their respective volumes of air.

Specifically, in the fourth operating mode, the air supply fan (31) and the exhaust fan (32) of each ventilation device (U) are operated in conjunction with each other such that a total cost including the first cost and a second cost that is required until the maintenance timing for the first to third instruments (E1 to E3) is a target value or less. The target value may be a predetermined value, a value appropriately set by a user, or a value automatically set. The second cost includes a cost of the power consumption of the air supply fans (31) and the exhaust fans (32) of the first to third ventilation devices (U1 to U3) at their respective volumes of air.

The target value of the total cost of this example is a value at which an estimated value of the total cost is the minimum. Specifically, the operation planning unit (55) creates a plurality of control patterns, and for each control pattern, calculates the total cost including the cost (first cost) required for the next maintenance and the cost (second cost) required until the next maintenance timing. The operation planning unit (55) selects a control pattern assumed to have the lowest total cost based on the estimation result. The control pattern may be control in which one or two ventilation devices are selected and operated in a concentrated manner, control in which two or three ventilation devices (U) are operated evenly, or control in which these types of control are combined. Such a control pattern is not limited to the fourth operating mode, and may be applied to the first to third operating modes.

Operation Control

Figure 4:
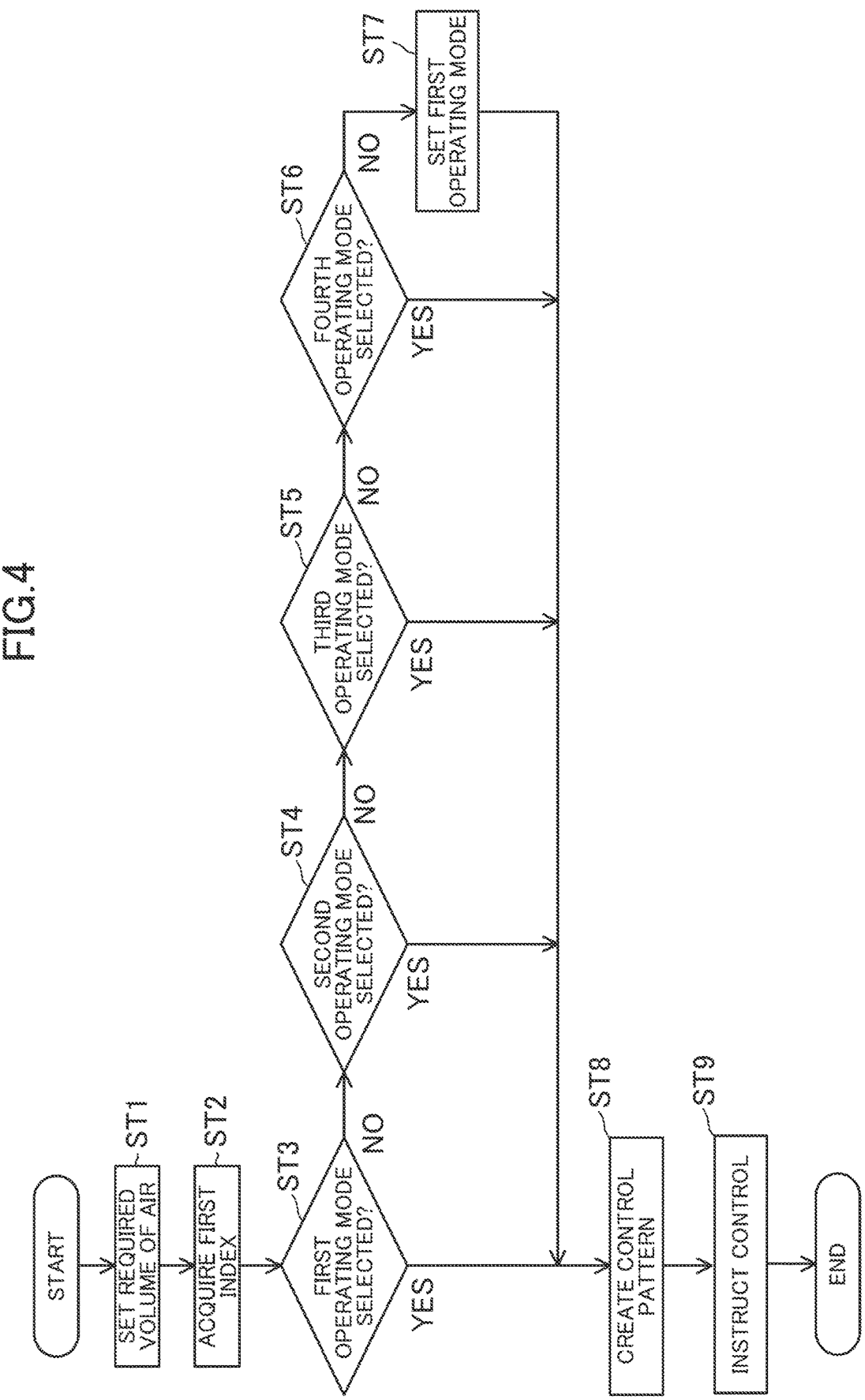
FIG. 4 is a flowchart of control of the ventilation device.

Operation control for each ventilation device (U) by the control device (C) will be described with reference to FIG. 4.

In Step ST1, the control device (C) sets the volume of air (required volume of air) required for supplying air to the indoor space. For example, the required volume of air may be determined based on the number of people in the indoor space, or may be determined based on a carbon dioxide concentration in the indoor space.

In Step ST2, the control device (C) acquires the value (first information) of the external static pressure of each ventilation device (U).

In Step ST3, the control device (C) determines whether the first operating mode is selected. If the first operating mode is selected, Step ST8 is executed. If the first operating mode is not selected, Step ST4 is executed.

In Step ST4, the control device (C) determines whether the second operating mode is selected. If the second operating mode is selected, Step ST8 is executed. If the second operating mode is not selected, Step ST5 is executed.

In Step ST5, the control device (C) determines whether the third operating mode is selected. If the third operating mode is selected, Step ST8 is executed. If the third operating mode is not selected, Step ST6 is executed.

In Step ST6, the control device (C) determines whether the fourth operating mode is selected. If the fourth operating mode is selected, Step ST8 is executed. If the fourth operating mode is not selected, Step ST7 is executed.

In Step ST7, the control device (C) sets the first operating mode.

In Step ST8, the control device (C) creates the control pattern for the first to third ventilation devices (U1 to U3) based on the operating mode selected in Steps ST3 to ST7.

In Step ST9, the control device (C) controls the air supply fans (31) and the exhaust fans (32) of the first to third ventilation devices (U1 to U3) in accordance with the control pattern created in Step ST8.

Advantages of First Embodiment

The control device (C) of the first embodiment includes: an acquisition unit (54) configured to acquire first information indicating information on an operating time of a first ventilation device (U1) and an environmental condition that influences a life of a first filter (E1) provided for the first ventilation device (U1) and information on an operating time of a second ventilation device (U2) and an environmental condition that influences a life of a second filter (E2) provided for the second ventilation device (U2); and a second control unit (C2) (control unit) configured to operate the first ventilation device (U1) and the second ventilation device (U2) in conjunction with each other based on the first information acquired by the acquisition unit (54).

According to the control device (C) of the first embodiment, the life of each filter (E) can be grasped based on the first information. It is possible to control the life of each filter (E) by operating the three ventilation devices (U1 to U3) in conjunction with each other based on the life of each filter (E). Thus, for example, the three ventilation devices (U1 to U3) may be operated such that the operating load will not be concentrated on a specific ventilation device (U), thereby making it possible to reduce ventilation impairment in the indoor space due to the end of life of any one of the filters (E). Particularly, unlike a case in which the three ventilation devices (U1 to U3) are operated equally based on the failure timing of a filter (E) for which a failure is predicted among the three filters (E), the control device (C) of this embodiment can control the three ventilation devices (U1 to U3) in consideration of the differences in life among the three filters (E1 to E3), thereby making it possible to control the maintenance timing of each filter (E).

In the control device (C) of the first embodiment, the second control unit (C2) operates the first to third ventilation devices (U1 to U3) in conjunction with each other such that the lives of the first to third filters (E1 to E3) end at the same timing. With this configuration, the three filters (E1 to E3) can be replaced at the same timing. As a result, the three filters (E1 to E3) can be replaced at once, and therefore, it is possible to reduce the cost as compared to a case where the filters are individually replaced at different timings.

In the control device (C) of the first embodiment, the second control unit (C2) operates the first to third ventilation devices (U1 to U3) in conjunction with each other such that the lives of the first to third filters (E1 to E3) sequentially end. With this configuration, the filters (E) can be replaced at different maintenance timings of the first ventilation device (U1), the second ventilation device (U2), and the third ventilation device (U3), thereby making it possible to reduce the cost for one maintenance timing.

The control device (C) of the first embodiment further includes an input unit (53) configured to receive information on predetermined operation of the first to third filters (E1 to E3) based on user's operation, wherein The second control unit (C2) operates the first to third ventilation devices (U1 to U3) in conjunction with each other based on the first information acquired by the acquisition unit (54) and the information on operation input to the input unit (53). With this configuration, the life of each filter (E) can be controlled with high accuracy in consideration of not only the first information on each filter (E) but also the information on operation of each filter (E).

In the control device (C) of the first embodiment, the information on the predetermined operation is a maintenance schedule for performing maintenance for the first to third filters (E1 to E3). The second control unit (C2) operates the first to third ventilation devices (U1 to U3) in conjunction with each other such that the lives of the first to third filters (E1 to E3) end in accordance with the maintenance schedule. With this configuration, the life of each filter (E) can be controlled in accordance with the maintenance schedule. This makes it possible to reduce failure of the filter (E)

at unexpected timing. In addition, the user can perform maintenance for each instrument (E) periodically.

In the control device (C) of the first embodiment, the maintenance schedule includes the timing of replacement of the first to third filters (E1 to E3). With this configuration, the filter (E) can be replaced after sufficient fulfillment of its performance. Energy can be saved since the filter (E) can be used up before replacement.

In the control device (C) of the first embodiment, the information on the predetermined operation is power consumption of the first to third ventilation devices (U1 to U3) and a first cost required for maintenance for the first to third instruments (E1 to E3). The second control unit (C2) operates the first to third ventilation devices (U1 to U3) in conjunction with each other such that a total cost including the first cost and a second cost that is required until a maintenance timing for the first to third instruments (E1 to E3) is a target value or less. With this configuration, it is possible to reduce the total cost required until the next maintenance timing. As a result, the cost can be saved.

In the control device (C) of the first embodiment, the first cost includes a cost required for installation, replacement, inspection, or repair of the first to third filters (E1 to E3), and the cost includes a component cost required for maintenance or a labor cost required for maintenance. Operation of each ventilation device (U) is controlled in consideration of the first cost, thereby making it possible to save the cost with higher accuracy.

In the control device (C) of the first embodiment, each of the first to third ventilation devices (U1 to U3) includes a suction port (22) through which a fluid is sucked, a discharge port (25) through which the fluid is discharged, and an air supply passage (26) (a fluid passage) connecting the suction port (22) and the discharge port (25) to each other. The filters (E1 to E3) are arranged in the air supply passage (26). The control device (C) of the present disclosure is applied to the ventilation devices (U1 to U3), so that the first to third devices (U1 to U3) can be operated in conjunction with each other based on the life of each filter (E).

In the first embodiment, each of the first to third ventilation devices (U1 to U3) further includes an air supply fan (31) (a conveyor) configured to convey the fluid in the air supply passage (26) by driving of a motor. In the first embodiment, the first information is the external static pressure of the air conveyed by the air supply fan (31). The volume of air supplied through the air supply port decreases when the external static pressure is high. This indicates that performance degradation of the filter (E) proceeds due to, e.g., clogging. In this manner, the life of the filter (E) can be grasped using the external static pressure as the first information.

The ventilation control system (10) (control system) of the embodiment includes the control device (C), the first ventilation device (U1), the second ventilation device (U2), and the third ventilation device (U3). With such a ventilation control system (10), ventilation impairment in the indoor space can be reduced.

First Variation of First Embodiment

Figure 5:
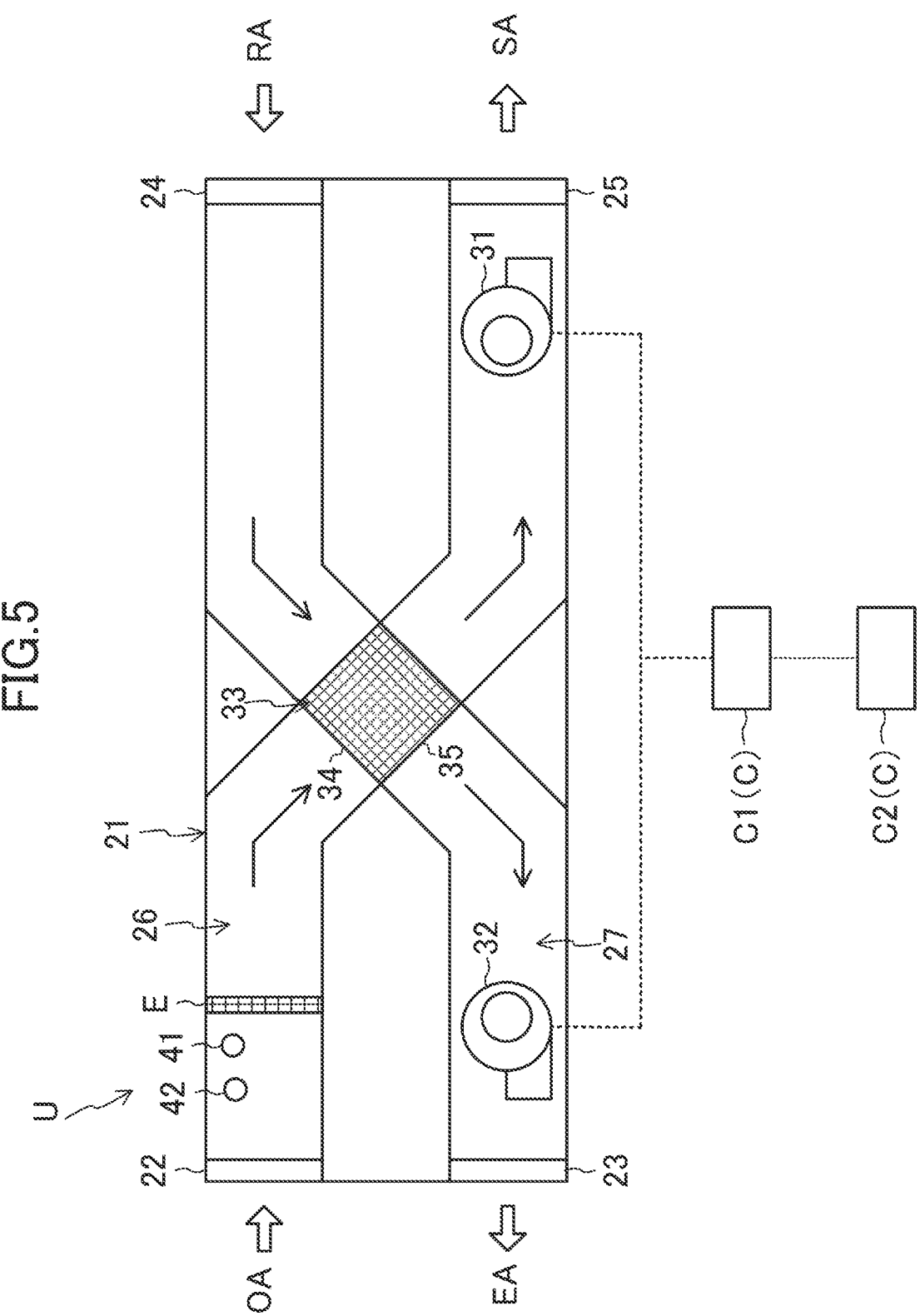
FIG. 5 is a diagram corresponding to FIG. 2 and illustrates a ventilation device according to a variation of the first embodiment.

As illustrated in FIG. 5, each ventilation device (U) of this example includes a dust sensor (41) and a wind speed sensor (42). In the following description, configurations different from those of the first embodiment will be described.

The dust sensor (41) and the wind speed sensor (42) are arranged upstream of the filter (E) in the air supply passage (26). The dust sensor (41) detects fine particles, such as those of dust and pollen, contained in air that has flowed into the air supply passage (26) through the outdoor air port (22). The wind speed sensor (42) detects a wind speed of air before passing through the filter (E) in the air supply passage (26).

The calculation unit (52) of this example calculates the amount of fine particles that adhere to the filter (E). Specifically, based on the detection value of the dust sensor (41) and the wind speed in the air supply passage (26), the calculation unit (52) calculates the amount of fine particles estimated to adhere to the filter (E). The fine particles are a deposit of the present disclosure. The amount of fine particles that adhere to the filter (E) in a certain period can be estimated from the amount of particles, per unit time, which are detected by the dust sensor (41) and larger than a predetermined particle size (for example, fine particles with a particle size that does not allow passage through the filter) and the wind speed.

The acquisition unit (54) of this example acquires the first information indicating: the information on the operating time of each ventilation device (U); and the environmental condition that influences the life of each filter (E). The environmental condition refers to the degree of contamination of air, and in this example, refers to the amount of fine particles estimated, by the calculation unit (52), to adhere to the filter (E). It is assumed that the greater the amount of fine particles that adhere to the filter (E) is, the further the performance degradation of the filter (E) has proceeded (life becomes shorter).

The second control unit (C2) of this example operates the ventilation devices (U) in conjunction with each other based on the first information acquired by the acquisition unit (54). Specifically, the second control unit (C2) operates the first to third ventilation devices (U1 to U3) in conjunction with each other based on the information on the operating time of each ventilation device (U) acquired by the acquisition unit (54) and the amount of fine particles that adhere to the filter (E) provided for each ventilation device (U).

This configuration makes it possible to control the life of each filter (E1 to E3). It is also possible to execute the first to fourth operating modes as in the first embodiment, based on the first information.

Second Variation of First Embodiment

Each ventilation device (U) of this example includes a dust sensor (41) and a wind speed sensor (42). In the following description, configurations different from those of the first embodiment will be described.

The detection unit (51) detects the environmental information at the time when the ventilation device (U) is in operation. Specifically, the detection unit (51) detects the amount of fine particles adhering to the filter (E) which has been calculated by the calculation unit (52) based on the information detected by the dust sensor (41) and the wind speed sensor (42).

The input unit (53) receives the selected operating mode. The operating mode may be selected by the user or automatically. For example, the input unit (53) receives the first operating mode or the second operating mode of the first embodiment.

The second control unit (C2) controls the ventilation devices (U) in conjunction with each other based on the environmental information detected by the detection unit (51) and the operating mode input to the input unit (53). The detection unit (51) may detect the state of each filter (E). Specifically, the detection unit (51) may detect the external static pressure of each ventilation device (U) or the power consumption or the number of rotations of each air supply fan (31). In this case, the second control unit (C2) controls the ventilation devices (U) in conjunction with each other based on the state of each filter (E) detected by the detection unit (51) and the operating mode input to the input unit (53).

Second Embodiment

Figure 6:
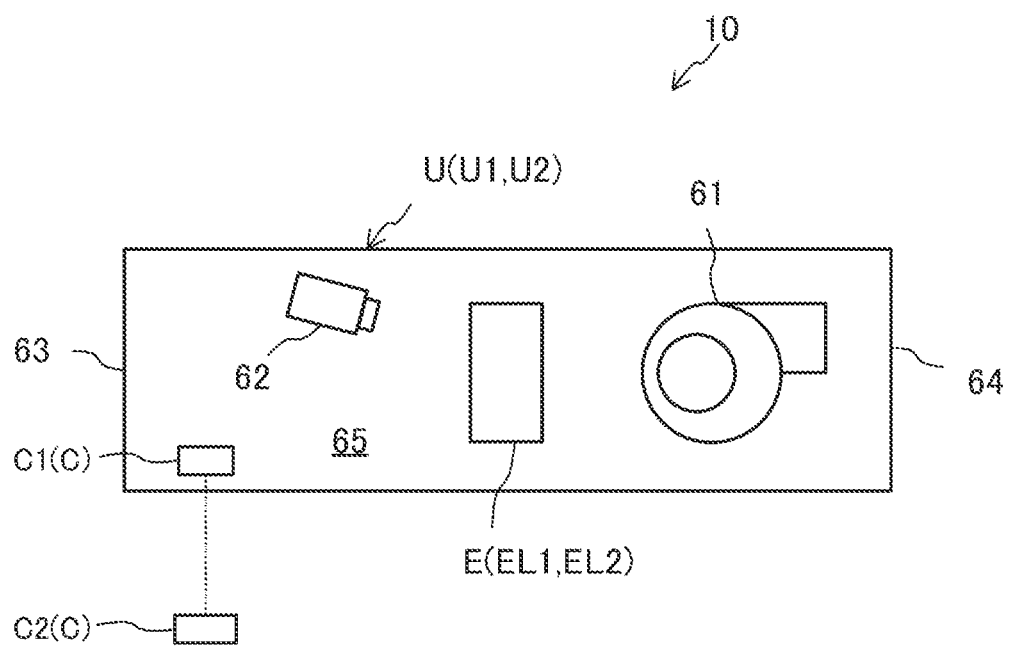
FIG. 6 is a configuration diagram schematically illustrating a ventilation device according to a second embodiment.

As illustrated in FIG. 6, a control device (C) of this example is applied to a plurality of electrostatic precipitators (U) (including a first electrostatic precipitator (U1) and a second electrostatic precipitator (U2)) arranged in an indoor space. A control system (10) of this example includes the control device (C) and the plurality of electrostatic precipitators (U).

In this example, a device (U) of the present disclosure is the electrostatic precipitator (U). The electrostatic precipitator (U) includes an electrode unit (E), a fan (61), and a camera (62). The electrode unit (E), the fan (61), and the camera (62) are arranged in an air passage (65) provided in the electrostatic precipitator (U) and connecting an air inlet (63) and an air outlet (64).

The fan (61) conveys the air in the air passage (65) from the air inlet (63) to the air outlet (64).

The electrode unit (E) collects contaminants, such as dust, contained in the air of the indoor space sucked through the air inlet (63). The electrode unit (E) is an instrument (E) of the present disclosure. Specifically, the electrode unit (E) has a discharge electrode (EL1) and a dust collection electrode (EL2). When a voltage is applied between the discharge electrode (EL1) and the dust collection electrode (EL2), an electric charge is applied to dust in the air sucked into the air passage (65), and the charged dust is attracted to the dust collection electrode (EL2). Longer operating time and a greater amount of fine particles, such as those of dust, contained in air result in an increase in the amount of fine particles adhering to the electrode unit (E) and shorter life.

In this example, first information of the present disclosure is based on image data of the electrode unit (E) and its periphery captured by the camera (62). Specifically, the first information is the degree of contamination of the electrode unit (E) and its periphery by the fine particles, which is determined from the image data.

As described above, in this example as well, the control device (C) operates the plurality of electrostatic precipitators (U) in conjunction with each other, based on the first information on the life of the electrode unit (E) provided for each electrostatic precipitator (U) (including the first information on the life of the first electrode unit (E1) of the first electrostatic precipitator (U1) and the first information on the life of the second electrode unit (E2) of the second electrostatic precipitator (U2)). With this configuration, the life of the electrode unit (E) of each electrostatic precipitator (U) can be controlled.

In this example, the first information may be a sensor value of the dust sensor (not shown) provided for the electrostatic precipitator (U). Specifically, the dust sensor is arranged downstream of the electrode unit (E) in the air passage (65). An increase in the value of the dust amount detected by the dust sensor indicates a decrease in the dust collection effect of the electrode unit (E). Thus, the first information can be the sensor value of the dust sensor.

Third Embodiment

A control system (10) of a third embodiment is applied to a plurality of machine tools arranged in a work room of a factory, for example. In this case, a device (U) of the present disclosure is a machine tool (not shown). The control system (10) includes a control device (C) and the plurality of machine tools.

The machine tool has a drill (not shown) and a detection unit (not shown) configured to detect wear of the drill. The drill is an instrument (E) of the present disclosure. The detection unit detects the degree of wear of the drill. The higher the detection value, the higher the degree of wear. First information on the life of the drill in this example is the detection value of the detection unit. In this manner, the control device (C) operates the plurality of machine tools in conjunction with each other based on the first information on the life of each drill. It is therefore possible to control the life of each drill (E).

Fourth Embodiment

A control system (10) of a fourth embodiment is applied to an automobile. Specifically, a device (U) of this example is drive wheels provided for the automobile. An instrument (E) of this example is four tires attached to the drive wheels. The control system (10) includes a detection device configured to detect the amount of wear of each tire. In this case, the amount of wear of the tire detected by the detection device is first information on the life of the tire. The control device (C) drives the drive wheels in conjunction with each other based on the first information. For example, if there is a difference in the degree of progress of wear among the four tires, the control device (C) controls the four drive wheels in conjunction with each other such that the degree of wear is substantially the same among the four tires.

OTHER EMBODIMENTS

The foregoing embodiment may be modified as follows.

In the above-described embodiment, the information on the life of each filter (E) is not necessarily based on the external static pressure. Specifically, the calculation unit (52) may estimate the remaining life of each filter (E) from the power consumption of each air supply fan (31) and the number of rotations of the motor. In this case, the acquisition unit (54) acquires the remaining life of each filter (E) estimated by the calculation unit (52). The second control unit (C2) operates the first to third ventilation devices (U1 to U3) in conjunction with each other based on the information on the remaining life of each filter (E) acquired by the acquisition unit (54).

In the first variation of the first embodiment, the first information does not necessarily include the operating time of each ventilation device (U). That is, the first information may be only the environmental information that influences the life of the filter (E).

In the first embodiment and the variations, the first information on the life of the filter (E) may be the number of rotations of the motor of the air supply fan (31) and the amount of power consumption by the air supply fan (31). The first information on the life of the filter (E) may be the number of rotations of the motor of the exhaust fan (32) and the amount of power consumption by the exhaust fan (32).

In the variations of the first embodiment, the first information on the life of the filter (E) may be a temporal change amount of the fine particles adhering to the filter (E).

In the first embodiment and the variations, the first information on the life of the filter (E) may be the external static pressure and the amount of fine particles adhering to the filter (E). Since the first information includes two types of information, the life of the filter (E) can be more accurately controlled.

In the first embodiment, the maintenance schedule may include information other than the timing of replacement of the filter (E). For example, the maintenance schedule may include inspection, repair, and other timings of the filter (E).

In the first embodiment, the maintenance may include installation, inspection, or repair of each filter (E). The second cost may be a cost required for installation of the filter (E) in the ventilation device (U) or inspection or repair of the filter (E). This cost may include a component cost required for installation, inspection, or repair and a labor cost required therefor.

The device (U) of the present disclosure may be, for example, an air cleaner, an air conditioner, a bag filter, a humidifier, a dehumidifier, or a water purifier as long as the device (U) includes the filter (E). The fluid flowing in the device (U) may be a liquid such as water.

The instrument (E) of the present disclosure may be any instrument or component whose performance degrades as the device (U) is operated.

The ventilation device (U) may have two or more filters (E). In this case, the control device (C) operates the plurality of ventilation devices (U) in conjunction with each other based on the first information on each filter (E).

The instrument (E) provided for the ventilation device (U) may be any instrument or component whose performance degrades with operation and may include an instrument or a component other than the filter (E). The ventilation device (U) may include an instrument including the filter (E).

The second control unit (C2) may be the cloud. The second control unit (C2) may be a controller fixed in the indoor space, or may be a controller arranged outdoor.

In the first embodiment, the information on the predetermined operation, which is input to the input unit (53), is not necessarily input based on user's operation. For example, in a case where the power consumption of the air supply fan (31) and the exhaust fan (32) is measured, the measurement values may be automatically input to the input unit (53).

In the first embodiment, the maintenance may be, for example, repair or maintenance and inspection of the filter (E). Further, the maintenance timing may be, for example, the timing of repair or maintenance and inspection of the filter (E).

The control by the control device (C) in the first embodiment may be performed multiple times until the maintenance timing comes. This control may be performed regularly or irregularly. This control may be performed, for example, in accordance with a change in the environment of the indoor space (e.g., room temperature, humidity, or oxygen concentration).

In the first embodiment, the control pattern created by the operation planning unit (55) may be a control pattern for the air supply fan (31) and the exhaust fan (32) or a control pattern only for the air supply fan (31).

In the first embodiment, the information on the life of the filter (E) may include the operating time of each ventilation device (U) in addition to the external static pressure.

It will be understood that the embodiments and variations described above can be modified with various changes in form and details without departing from the spirit and scope of the claims. The embodiments and variations described above may be appropriately combined or modified by replacing the elements thereof, as long as the functions of the subject matter of the present disclosure are not impaired. The expressions of "first," "second," . . . described above are used to distinguish the terms to which these expressions are given, and do not limit the number and order of the terms.

As described above, the present disclosure is useful for the control device and the control system.

The invention claimed is:

1. A control device configured to control a first ventilation device and a second ventilation device that ventilate a same indoor space, the control device comprising:
   a controller including a processor,
   the controller being configured to acquire first information indicating
      information on a first operating time of the first ventilation device and an environmental condition that influences a life of a first instrument provided for the first ventilation device, the first operating time being a duration over which the first ventilation device has been operated, and
      information on a second operating time of the second ventilation device and an environmental condition that influences a life of a second instrument provided for the second device, the second operating time being a duration over which the second ventilation device has been operated,
   the controller being further configured to operate the first ventilation device and the second ventilation device in conjunction with each other based on the first information acquired, wherein
   each of the first ventilation device and the second ventilation device includes
      a suction port through which a fluid is sucked,
      a discharge port through which the fluid is discharged, and
      a fluid passage connecting the suction port and the discharge port to each other,
   the first instrument and the second instrument are filters arranged in the fluid passage, and
   the information on the environmental condition is information indicating a degree of contamination of the fluid in the fluid passage.

2. A control device configured to control a first ventilation device and a second ventilation device that ventilate a same indoor space, the control device comprising:
   a controller including a processor,
   the controller being configured to acquire first information on a life of a first instrument provided for the first ventilation device and a life of a second instrument provided for the second ventilation device,
   the controller being further configured to
      set operating states of the first ventilation device and the second ventilation device by allocating a volume of air for each of the first ventilation device and the second ventilation device so as to satisfy a volume of air required for the indoor space, the operating states being set based on the first information acquired, and
      operate the first ventilation device and the second ventilation device in conjunction with each other based on the operating states, wherein
   each of the first ventilation device and the second ventilation device includes
      a suction port through which a fluid is sucked,
      a discharge port through which the fluid is discharged,
      a fluid passage connecting the suction port and the discharge port to each other, and
      a conveyor that is driven by a motor and configured to convey the fluid in the fluid passage,
   the first instrument and the second instrument are filters arranged in the fluid passage, the first information is a static pressure of the fluid obtained based on a power consumption of each conveyor and a number of rotations of the motor.

3. A control device configured to control a first ventilation device and a second ventilation device that ventilate a same indoor space, the control device comprising:
a controller including a processor,
the controller being configured to
detect current operating states of first ventilation device and a second ventilation device,
estimate, from the operating states,
a remaining life of a first instrument provided for the first ventilation device and
a remaining life of a second instrument provided for the second ventilation device,
acquire first information indicating the remaining lives of the first instrument and the second instrument that were estimated; and
operate the first device and the second device in conjunction with each other based on the first information acquired, wherein
each of the first ventilation device and the second ventilation device includes
a suction port through which a fluid is sucked,
a discharge port through which the fluid is discharged,
a fluid passage connecting the suction port and the discharge port to each other, and
a conveyor that is driven by a motor and configured to convey the fluid in the fluid passage,
the first instrument and the second instrument are filters arranged in the fluid passage,
the controller is further configured to a detect power consumption of each the conveyors and a number of rotations of each of the motors, and to obtain a static pressure of the fluid conveyed by each of the conveyors based on the power consumption of each the conveyors and the number of rotations of each of the motors,
the first information is the static pressure of the fluid conveyed by each of the conveyors.

4. The control device of claim 1, wherein
the controller is configured to operate the first ventilation device and the second ventilation device in conjunction with each other such that the lives of the filter of the first ventilation device and the filter of the second ventilation device end at a same timing.

5. The control device of claim 1, wherein
the controller is configured to operate the first ventilation device and the second ventilation device in conjunction with each other such that the lives of the filter of the first ventilation device and the filter of the second ventilation device end sequentially.

6. The control device of claim 1, wherein
the controller is configured to receive information on a predetermined operation of the filter of the first ventilation device and the filter of the second ventilation device based on a user's operation, and the controller is configured to operate the first ventilation device and the second ventilation device in conjunction with each other based on the first information acquired and the information on the predetermined operation that was received.

7. The control device of claim 6, wherein
the information on the predetermined operation is a maintenance schedule for performing maintenance for the filter of the first ventilation device and the filter of the second ventilation device, and
the controller is configured to operate the first ventilation device and the second ventilation device in conjunction with each other such that the lives of the filter of the first ventilation device and the filter of the second ventilation device end in accordance with the maintenance schedule.

8. The control device of claim 7, wherein
the maintenance schedule includes a timing of replacement of the filter of the first ventilation device and the filter of the second ventilation device.

9. The control device of claim 6, wherein
the information on the predetermined operation is a power consumption of the first ventilation device and the second ventilation device and a first cost required for maintenance for the filter of the first ventilation device and the filter of the second ventilation device, and
the controller is configured to operate the first ventilation device and the second ventilation device in conjunction with each other such that a total cost including the first cost and a second cost is a target value or less, the second cost being a cost that is required until a maintenance timing for the filter of the first ventilation device and the filter of the second ventilation device.

10. The control device of claim 9, wherein
the first cost includes a required cost for installation, replacement, inspection, or repair of the filter of the first ventilation device and the filter of the second ventilation device, the required cost including a component cost required for maintenance or a labor cost required for maintenance.

11. The control device of claim 1, wherein
the first information is an amount of a deposit that adheres to the filters or a temporal change amount of the deposit.

12. The control device of claim 1, wherein
each of the first ventilation device and the second ventilation device further includes a conveyor configured to convey the fluid in the fluid passage by driving of a motor, and
the first information is a number of rotations, a power consumption, or an operating time of the motor or a static pressure of the fluid conveyed by the conveyor.

13. A control system including the control device, the first ventilation device, and the second ventilation device according to claim 1.

* * * * *